(12) United States Patent
Hosono et al.

(10) Patent No.: US 7,465,433 B2
(45) Date of Patent: Dec. 16, 2008

(54) METHOD FOR PREPARING ELECTROCONDUCTIVE MAYENITE TYPE COMPOUND

(75) Inventors: Hideo Hosono, Yamato (JP); Katsuro Hayashi, Kawasaki (JP); Masashi Miyakawa, Yokohama (JP); Masahiro Hirano, Tokyo (JP); Sungwng Kim, Kawasaki (JP); Setsuro Ito, Yokohama (JP); Satoru Narushima, Yokohama (JP)

(73) Assignees: Asahi Glass Company, Limited, Tokyo (JP); Japan Science and Technology Agency, Kawaguchi-shi (JP)

( * ) Notice: Subject to any disclaimer, the term of this patent is extended or adjusted under 35 U.S.C. 154(b) by 140 days.

(21) Appl. No.: 11/503,244

(22) Filed: Aug. 14, 2006

(65) Prior Publication Data

US 2006/0276326 A1 Dec. 7, 2006

Related U.S. Application Data

(63) Continuation of application No. PCT/JP2005/001848, filed on Feb. 8, 2005.

(30) Foreign Application Priority Data

Feb. 13, 2004 (JP) .............................. 2004-037203

(51) Int. Cl.
*C01F 7/00* (2006.01)
*C01F 11/02* (2006.01)

(52) U.S. Cl. ..................... 423/600; 501/94; 423/594.16; 252/518.1

(58) Field of Classification Search ................... 501/94; 252/500, 518.1, 519.1; 423/600, 594.16
See application file for complete search history.

(56) References Cited

U.S. PATENT DOCUMENTS 2,976,339 A * 3/1961 Bussard et al. ................ 373/68
3,842,015 A * 10/1974 Vogt et al. .................. 502/241
5,998,315 A * 12/1999 Jubb ........................... 501/36
2005/0053546 A1 * 3/2005 Hosono et al. .............. 423/600
2006/0276326 A1 12/2006 Hosono et al.

FOREIGN PATENT DOCUMENTS

| EP | 1 215 173 | 6/2002 |
| EP | 1 445 237 | 8/2004 |
| EP | 1 650 164 | 4/2006 |
| JP | 2002-3218 | 1/2002 |
| JP | 2002-316867 | 10/2002 |
| JP | 2003-40697 | 2/2003 |
| JP | 2003-128415 | 5/2003 |
| JP | 2003-226571 | 8/2003 |
| JP | 2003-238149 | 8/2003 |
| JP | 2004-26608 | 1/2004 |
| WO | WO 2005/000741 | 1/2005 |

OTHER PUBLICATIONS

Y. Toda et al. "Thin film fabrication of nano-porous 12CaOo7Al2O3 crystal and its conversion into transparent conductive films by light illumination", Thin Solid Films 445 (Dec. 2003) p. 309.*
U.S. Appl. No. 11/948,053, filed Nov. 30, 2007, Hosono, et al.
U.S. Appl. No. 11/948,147, filed Nov. 30, 2007, Hosono, et al.
Bartl et al, Neuses Jahrb. Mineral. Monatsh., 1970, p. 547.
Williams, Acta Cryst., 1973 Sec. B, vol. 29, p. 1550.
Neubauer et al, Cement and Concrete Research, 1994, vol. 24, No. 8, pp. 1413-1422.
Nurse et al, Transactions of the British Ceramic Society, 1965, vol. 64, No. 9, pp. 409-418.

* cited by examiner

*Primary Examiner*—Jessica L Ward
*Assistant Examiner*—Nicholas P D'Aniello
(74) *Attorney, Agent, or Firm*—Oblon, Spivak, McClelland, Maier & Neustadt, P.C.

(57) ABSTRACT

To provide a method for preparing a mayenite type compound having electroconductivity imparted.

A method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by cooling or annealing in a low oxygen partial pressure atmosphere or in atmospheric air for solidification, thereby to replace oxygen present in cages by electrons in a high concentration.

10 Claims, No Drawings

METHOD FOR PREPARING ELECTROCONDUCTIVE MAYENITE TYPE COMPOUND

TECHNICAL FIELD

The present invention relates to a method for preparing a mayenite type compound having electroconductivity imparted.

BACKGROUND ART

Mayenite is a cement mineral naturally produced in Mayen in Germany, and its crystal structure belongs to a cubic system. The typical composition of the mayenite type compound is $12CaO.7Al_2O_3$ (hereinafter referred to as C12A7) or $12SrO.7Al_2O_3$ (hereinafter referred to as S12A7), or a mixed crystal composition thereof. However, part of Ca or Sr may be replaced by an alkali metal or alkaline earth metal such as K, Na, Li, Mg or Ba or part of Al may be replaced by a metal element having an ion radius of from about 0.5 to 0.8 Å such as Si or Ge.

Ca or Al is a common component for ceramic materials and has been used mainly as one component for structural materials. Usually, an oxide of a metal in or before the third period, including such a compound, is electrically dielectric and shows no electroconductivity.

Heretofore, oxide ceramics showing electroconductivity were ones containing a large amount of an oxide of a transition metal or a typical metal in or after the forth period of Periodic Table of Elements, whereby the environmental load was high.

A crystal of the mayenite type compound has, in its crystal lattice, fine voids (cages) having a diameter of 0.6 nm at a rate of 12 cages per unit lattice, and a C12A7 crystal as its typical composition contains two $O^{2-}$ ions per unit lattice in the cages. Namely, the C12A7 crystal is represented by $[Ca_{24}Al_{28}O_{64}]^{4+}.2O^{2-}$, and such $O^{2-}$ ions are called "free oxygen" as they are weakly bound (Non-Patent Document 1).

Further, a crystal represented substantially by $[Ca_{24}Al_{28}O_{64}]^{4+}.4F^-$ or $[Ca_{24}Al_{28}O_{64}]^{4+}.4Cl^-$, having such free oxygen replaced by fluorine or chlorine, is known (Non-Patent Documents 2 and 3).

Hosono as one of the present inventors, et al, previously found anew that such free oxygen can be replaced by various anions such as $O_2^-$, $O^-$ and $OH^-$ and filed patent applications with respect to inventions relating to the compound itself, a process for its production and applications for such a compound (Patent Documents 1 to 6).

Further, Hosono et al found that when a C12A7 powder as a mayenite type compound obtained by a solid phase reaction, or its sintered product, was subjected to heat treatment in a hydrogen atmosphere to prepare a C12A7 compound having $H^-$ taken in the cages, and then, the compound was irradiated with ultraviolet light to have electrons taken in the cages, it was possible to impart electroconductivity. And, they filed a patent application with respect to the invention relating to the compound itself, a process for its production and applications of such a compound.

However, by such a preparation method wherein $H^-$ is clathrated in the above sintered product, followed by irradiation with ultraviolet light, electrons are clathrated only at the surface portion of the sintered product irradiated with the ultraviolet light, and it was not possible to clathrate electrons into the interior of the powder or sintered product being a region not irradiated.

Further, Hosono et al developed a method for preparing a C12A7 single crystal and found it possible to impart electroconductivity to such a crystal by exposing the crystal to an alkaline vapor to have electrons clathrated in cages, and they filed a patent application with respect to the invention relating to the compound itself, a method for its production and applications of such a compound (Patent Document 6).

This preparation method utilizes a reaction to withdraw free oxygen from the C12A7 crystal in a solid state. However, in such a reaction, diffusion of oxygen in the interior of the solid became a rate-determining step, and it took a long time to have electrons clathrated in a sufficient amount.

On the other hand, the present inventors knew that in a molten state of C12A7 at a high temperature, the diffusion coefficient of the oxygen could be made high as compared with in a solid state, whereby the reaction to withdraw free oxygen proceeded quickly.

However, it was known that when a furnace circulating nitrogen was employed, from the melt having a C12A7 composition, a $3CaO.Al_2O_3$ (hereinafter referred to as C3A) phase and a $CaO.Al_2O_3$ (hereinafter referred to as CA phase) could form as decomposition products and no C12A7 crystal would be formed. Thus, it was usually difficult to simultaneously carry out the reaction to withdraw oxygen and the reaction to form a C12A7 crystal (Non-Patent Document 4).

Hosono et al found that by reducing the surface area of the raw material by employing an isostatistic pressing product having a dense structure as compared with a powder, it was possible to make mild the reaction to withdraw oxygen in the temperature rising process being a reaction which took place at the surface, whereby it was possible to suppress formation of decomposition products, and they invented a method for preparing a C12A7 compound having oxygen in cages replaced by electrons, which comprises melting an isostatistic pressing product of C12A7 powder in a reducing atmosphere or in a covered carbon crucible and filed a patent application (Patent Document 6).

Patent Document 1: JP-A-2002-3218
Patent Document 2: JP-A-2003-40697
Patent Document 3: JP-A-2003-128415
Patent Document 4: JP-A-2002-316867
Patent Document 5: JP-A-2003-238149
Patent Document 6: JP-A-2004-26608
Patent Document 7: Japanese Patent Application No. 2003-183605
Non-Patent Document 1: H. B. Bartl and T. Scheller, Neuses Jarhrb. Minerai, Monatsh. (1970), 547
Non-Patent Document 2: P. P. Williams, Acta Crystallogr., Sec. B, 29, 1550 (1973)
Non-Patent Document 3: H. Pollmann, F. Kammerer, J. Goske, J. Neubauer, Friedrich-Alexander-Univ. Erlangen-Nurnberg, Germany, ICDD Grant-in-Aid, (1994)
Non-Patent Document 4: R. W. Nurse, J. H Welch, A. J. Majumdar, Transactions of the British Ceramic Society (1965), 64(9), 409-18

DISCLOSURE OF THE INVENTION

Object to be Accomplished by the Invention

An object of the present invention is to provide a method for producing an electroconductive mayenite type compound inexpensively and by a mass production. Namely, it is to provide a method for producing a conductive mayenite type compound by using an inexpensive low purity amorphous and/or crystalline compound as the raw material i.e. by melting it in an atmosphere having a low oxygen partial pressure and then solidifying it.

Means to Accomplish the Object

The present inventors have found it possible to obtain an electroconductive mayenite type compound having oxygen in cages replaced by electrons in a high concentration, by melting a raw material for a mayenite type compound under a condition having the atmosphere composition and temperature controlled, followed by cooling, even when a crystalline and/or non-crystalline raw material is employed.

Namely, the present invention provides a method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by cooling for solidification.

Further, the present invention provides the method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by cooling in a low oxygen partial pressure atmosphere for solidification.

Further, the present invention provides the method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by cooling in atmospheric air for solidification.

Further, the present invention provides the method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by annealing for solidification.

Further, the present invention provides the above method for preparing an electroconductive mayenite type compound, wherein the cooling rate is at least 200° C./hr and at most 500° C./hr.

Further, the present invention provides the method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by cooling the melt in air for solidification.

Further, the present invention provides the above method for preparing an electroconductive mayenite type compound, wherein the cooling rate is more than 500° C./hr and at most 1,000° C./hr.

Further, the present invention provides the method for preparing an electroconductive mayenite type compound, which comprises melting a raw material containing Al and at least one element selected from the group consisting of Ca and Sr, holding the melt in a low oxygen partial pressure atmosphere having an oxygen partial pressure of not higher than 10 Pa, followed by discharging and cooling the melt for solidification.

Further, the present invention provides the above method for preparing an electroconductive mayenite type compound, wherein the raw material comprises, as represented by mol% and as calculated as the following oxides, from 15 to 66% of at least one member selected from the group consisting of CaO and SrO, from 14 to 63% of $Al_2O_3$, from 0 to 38% of $SiO_2$, from 0 to 38% of $GeO_2$, from 0 to 38% of $B_2O_3$, from 0 to 5% of $Li_2O$, from 0 to 5% of $Na_2O$, from 0 to 5% of $K_2O$, from 0 to 10% of MgO, from 0 to 10% of BaO, from 0 to 8% of $Fe_2O_3$ and from 0 to 8% of $TiO_2$, and the total of molar ratios of CaO, SrO and $Al_2O_3$ is at least 25%.

Further, the present invention provides the method for preparing an electroconductive mayenite type compound, wherein the raw material is an amorphous material, a crystalline material or a mixture of amorphous and crystalline materials.

Further, the present invention provides the method for preparing an electroconductive mayenite type compound, wherein the mayenite type compound has a direct current conductivity of at least $10^{-4}$ S/cm.

Further, the present invention provides the method for preparing an electroconductive mayenite type compound, wherein the electroconductive mayenite type compound thus prepared, is held in air at a temperature of at least 500° C. and not more than the melting point of the compound to adjust the electroconductivity.

Further, the present invention provides the method for preparing an electroconductive mayenite type compound, wherein the electroconductive mayenite type compound thus prepared, is held in air at a temperature of at least 500° C. and not more than the melting point of the compound to adjust the electroconductivity to be at least $10^{-10}$ S and at most $10^3$ S/cm.

EFFECTS OF THE INVENTION

According to the present invention, the raw material for an electroconductive mayenite type compound is melted and cooled under a condition having the atmosphere composition and temperature controlled, whereby it is possible to provide an electroconductive mayenite type compound having oxygen in cages replaced by electrons in a high concentration even if a crystalline and/or amorphous inexpensive raw material is employed.

Further, in the present invention, for example, a raw material which is a mixture of simple oxides containing constituting elements, may preliminarily be directly sintered to obtain a sintered product, whereby it is made possible to suppress the reaction to withdraw oxygen in the same manner as an isostatistic pressing product like in Patent Document 7, and it is possible to provide an industrially useful method by omitting processes relating to the preparation of a powder of the sintered material and the preparation of a formed product. As such a sintered product, the sintered density is particularly preferably at a level of from 45 to 50%. Such a sintered product may be in a powder form or a baked powder form. Further, it may be a formed sintered product if a forming process is acceptable.

Further, in the present invention, even by using an amorphous raw material which has a high productivity as compared with a crystalline raw material, it is possible to industrially easily produce an electroconductive mayenite type compound having oxygen in cages replaced by electrons in a high concentration by melting and cooling under a condition having the atmosphere composition and temperature controlled.

Further, by a usual melting/solidifying method in air, the resulting solidified product is coarse due to foaming from the mayenite type compound. However, according to the present invention, melting is carried out under an oxygen partial pressure of not higher than 10 Pa, whereby a dense electroconductive mayenite type compound can be produced. Further, by heating the electroconductive mayenite type compound produced by this method in air at a temperature of not higher than the melting point, more preferably in air at a temperature of at least 500° C. and at most the melting point of the compound, it is possible to produce an electroconductive mayenite type compound having an electroconductivity controlled within a range of from $10^{-10}$ to $10^3$ S/cm.

Further, in the present invention, it is possible to provide an industrially advantageous production method whereby the melting point of the raw material can be lowered by changing the raw material composition by an addition of an alkali metal or an alkaline earth metal, or Si, Ge or B to C12A7 or S12A7.

Further, it is possible to provide a method for preparing an inexpensive electroconductive mayenite type compound, as it has been made possible to employ an inexpensive low purity material.

BEST MODE FOR CARRYING OUT THE INVENTION

As the raw material in the present invention, according to the percolation theory, with respect to a solidified product, electroconductivity can be imparted to the entire solidified product if an electroconductive mayenite type compound is present in an amount of at least 25% by volume, and accordingly, in the preparation of the electroconductive solidified product, it is sufficient that the starting material contains at least about 25% by a molar ratio, as calculated as an oxide, of e.g. Ca, Sr or Al as an element constituting the mayenite type compound. Further, in a case where a solidified product is a mixture of an electroconductive mayenite type compound and another vitreous or crystalline material, cracking of the solidified product during the cooling process will be hindered, and the mechanical properties of the solidified product will be improved.

Namely, as the raw material, a crystalline or amorphous material, or a mixture of crystalline and amorphous materials, is used which contains at least 25% by a molar ratio, as calculated as oxides, of Ca, Sr and Al as a typical composition of a mayenite type compound. Such a raw material may be crystals obtained by a solid phase reaction, or a crystalline or amorphous solidified product obtained by melting and solidifying such a composition in air.

From the foregoing, the composition (as represented by mol %) of the raw material is particularly preferably such that as calculated as oxides, at least one member selected from the group consisting of CaO and SrO is from 15 to 66%. If it is less than 15% or more than 66%, the electroconductive mayenite type compound contained in the solidified product will be less than 25%, whereby no electroconductivity will be imparted. It is particularly preferably from 61 to 65%, whereby the yield of the electroconductive mayenite type compound will be best. Further, $Al_2O_3$ is preferably adjusted to be from 14 to 63%. If it is less than 14% or more than 63%, the electroconductive mayenite type compound contained in the solidified product will be less than 25%, whereby no electroconductivity will be imparted. It is particularly preferably from 35 to 39%, whereby the yield of the electroconductive mayenite type compound will be best.

Each of $SiO_2$, $GeO_2$ and $B_2O_3$ is from 0 to 38%, preferably from 7 to 17%, whereby the melting temperature becomes lowest, and the productivity of the solidified product will be improved. If it exceeds 38%, the electroconductive mayenite type compound contained in the solidified product will be less than 25%, whereby no electroconductivity will be imparted.

Each of $Li_2O$, $Na_2O$ and $K_2O$ as a component to lower the melting temperature, is from 0 to 5%, preferably from 0 to 3%. Each of MgO and BaO as a component to lower the melting temperature is from 0 to 10%, preferably from 0 to 5%. Each of $Fe_2O_3$ and $TiO_2$ as an impurity component is from 0 to 8%, preferably at most 1%. Further, the raw material may contain less than 1% of at least one of typical metal elements or transition metal elements.

The raw material to be used in the present invention is not limited to a compound material such as calcium carbonate, strontium carbonate or aluminum oxide, and lime stone, slaked lime, quick lime, alumina, aluminum hydroxide, bauxite, aluminum residual ash or the like, which is useful as a material for a mayenite type compound, may also be employed. Further, C12A7 crystals or S12A7 crystals as natural minerals may also be employed.

In the above composition of the raw material, Si and Ge as tetravalent cations are substituted at positions occupied by Al as trivalent cations in a mayenite type compound, in the solidification process from the melt, whereby the amount of electrons clathrated in cages will be increased by the same effects as substitution doping in usual semiconductors, and as a result, the electroconductivity of the solidified product can be made large as compared with a case where Si and Ge are not contained.

The above raw material may be melted as it is. However, it is preferred that the raw material is preliminarily sintered to form a sintered powder or a baked powder so that melting can be facilitated.

In the present invention, a raw material containing Al and at least one element selected from the group consisting of Ca and Sr, is melted. The temperature for this melting is at least 1,415° C. and lower than the boiling point of the raw material, preferably a temperature of from 1,550° C. to 1,650° C. If it is lower than 1,415° C., the raw material will not melt, whereby a dense solidified product can hardly be obtained. On the other hand, if it is the boiling point or higher, due to the difference in the vapor pressure among the constituting elements, the initial composition cannot be maintained, and an electroconductive mayenite type compound can hardly be obtainable. In order to carry out the melting safely by means of a usual electric furnace, a temperature of from 1,550° C. to 1,650° C. is preferred.

In the present invention, the molten raw material is held in a low oxygen partial pressure atmosphere having an oxygen partial pressure of not higher than 10 Pa. As a method for controlling the atmosphere to have the oxygen partial pressure of not higher than 10 Pa, a gas such as $N_2$ may be circulated into a closed system electric furnace, whereby the oxygen partial pressure can be lowered to a level of 10 Pa. More preferably, sealing is carried out by a carbon material, and heating is carried out at a temperature of at least 1,400° C., whereby a still lower oxygen partial pressure can be obtained in a sealed atmosphere. Namely, in an atmosphere sealed with a carbon material, the remaining oxygen reacts preferentially with the carbon material to form CO or $CO_2$. Incidentally, if the equilibrium constants of this reaction and a reaction of such a gas with the raw material, such as CaO and $Al_2O_3$, or SrO and $Al_2O_3$, are employed, the oxygen partial pressure in a sealed atmosphere at 1,600° C. is about $10^{-15}$ Pa.

The above low oxygen partial pressure atmosphere having an oxygen partial pressure of not higher than 10 Pa is particularly preferably within a range of from about $10^{-18}$ Pa to $10^{-2}$ Pa. If the oxygen partial pressure is at most $10^{-2}$ Pa, the oxidation reaction of the electroconductive mayenite type compound is suppressed, whereby the electroconductivity of the solidified product can be increased. On the other hand, in order to bring it to a level of less than $10^{-18}$ Pa, an expensive installation will be required.

With respect to the material for a crucible, it is preferred to employ a covered carbon crucible when it is held in a usual electric furnace. In a furnace of non-oxidizing atmosphere or reducing atmosphere, not only a carbon crucible, but also an oxide crucible such as a magnesia or alumina crucible, a noble metal crucible made of e.g. platinum or molybdenum, or an industrially advantageous brick material may be used.

Further, in the present invention, an electroconductive mayenite type compound is prepared by melting a raw material containing Al and at least one element selected from the group consisting of Ca and Sr, holding the melt i.e. the melt of the raw material, in a low oxygen partial pressure atmosphere having an oxygen partial pressure of not higher than 10 Pa, followed by cooling. This cooling includes annealing, quenching or cooling in air. In a case where the cooling method is annealing, the cooling rate is preferably at least 200° C./hr and at most 500° C./hr, particularly preferably at most 400° C./hr. If it is less than 200° C./hr, the time required for the preparation tends to be so long. On the other hand, in order to obtain a cooling rate exceeding 500° C./hr, an extensive installation will be required, since such a rate can hardly be obtainable by a usual electric furnace. In the case of cooling in the above low oxygen partial pressure atmosphere, the oxygen partial pressure is specifically more preferably within a range of from about $10^{-8}$ Pa to $10^{-2}$ Pa. When the oxygen partial pressure is at most 10 Pa, the electrical conductivity of the solidified product can be increased. Further, in order to bring it to a level of at most $10^{-18}$ Pa, an expensive installation will be required.

In a case where the melt is discharged and cooled, if the melt at a high temperature is exposed to air, a reaction to take in oxygen will take place rapidly. In such a case, if the melt is cast on an iron plate or the like, the periphery of the melt will be covered by a vitreous portion, whereby such a reaction is suppressed, and it is possible to prepare an electroconductive mayenite type compound having oxygen in cages replaced by electrons. Such a method is industrially advantageous, since it is thereby possible to omit a step of taking out the solidified product from the crucible which is required as a result of fixing of the solidified melt to the crucible. Further, the discharged melt may be cast in a mold for shaping. In such a case, the cooling rate is preferably more than about 500° C./hr and at most 1,000° C./min, more preferably more than 500° C./hr and at most 1,000° C./hr. If it is 500° C./hr or less, covering by the vitreous portion will not sufficiently be formed, and no adequate amount of electrons may be clathrated in the mayenite type compound thereby prepared. If it exceeds 1,000° C./sec, the entire melt tends to be vitreous, whereby the yield of the electroconductive mayenite type compound will be decreased.

Further, by carrying out cooling and solidification of the melt in an atmosphere having an oxygen partial pressure of not higher than 10 Pa, and having the cooling rate and form controlled by means of twin rollers, it is possible to prepare an electroconductive mayenite type compound having oxygen in cages replaced by electrons in a high concentration. According to this method, it is possible to provide a method for preparing an electroconductive mayenite type compound by omitting a step of producing crystals of a non-electroconductive mayenite type compound which has been used as a precursor for an electroconductive mayenite type compound.

Now, a method for imparting electroconductivity by a solidification method will be described in detail with reference to C12A7 as a typical composition of a mayenite type compound.

Free oxygen clathrated in cages of C12A7 crystals becomes chemically active in an atmosphere having a low oxygen partial pressure at a temperature of at least 1,200° C. and will be discharged out of the crystals in a non-oxidizing atmosphere or in a reducing atmosphere.

On the other hand, C12A7 glass has been reported as foam glass, and the gas species discharged from the glass causing such foam is oxygen. Foaming is initialized in the vicinity of the glass transition point, and the amount of oxygen thereby discharged from the glass depends on the conditions for preparation of the glass, the form of the glass, and the heating temperature of the glass and the holding time.

As mentioned above, depending upon the form of the raw material, the degree of the reaction to withdraw oxygen in the temperature raising process varies. Namely, the reaction to withdraw free oxygen proceeds in the vicinity of the surface of the material, whereby the amount of oxygen withdrawn depends on the surface area of the material.

In the melt, by the reaction with the atmosphere or the crucible material, the reaction to withdraw oxygen from the melt and the accompanying donation of electrons to the melt will proceed. Here, the proportion of the amount of substitution of electrons for oxygen in the entire melt depends on the holding time and the mass of the melt.

The crystalline phase to be formed by the solidification from the melt usually corresponds to crystals having the highest crystal-nucleation rate. In a melt of oxygen-deficient type formed by the reaction to withdraw oxygen, the C12A7 crystal-nucleation rate is in a competitive relation with a decomposition product such as C3A or CA crystals.

By a change in the melting time, it is possible to control the proportion of the amount of substitution of electrons for oxygen in the entire melt and to change the concentration of embryos of C12A7 crystal nuclei and the nucleation activating energy. As a result, the C12A7 crystal-nucleation rate can be made higher than other decomposition product phases.

Namely, the C12A7 crystal-nucleation rate relative to the decomposition product phases, due to an increase in the amount of substitution of electrons for oxygen due to a change in the melting time is such that immediately after the initiation of melting, embryos of C12A7 crystal nuclei are in a sufficient concentration, and C12A7 crystals will be formed from the solidified product, but the amount of substitution of electrons for oxygen is small, whereby most of cages in the formed C12A7 compound will be occupied by oxygen.

As the amount of substitution further increases, due to a decrease of embryos of C12A7 crystal nuclei, the C12A7 crystal-nucleation rate will decrease, and decomposition product phase of C3A or CA will be obtained as a solidified product. Such crystals have no cages and cannot clathrate electrons.

If a sufficient amount of substitution of electrons for oxygen is secured by the control of the melting time, the electron capture center in the melt will supply electrons to embryo nuclei, whereby the nucleation activating energy will be reduced, and an electroconductive C12A7 compound will be obtained as a solidified product of the melt. If the amount of substitution becomes excessive, the embryo nuclei will disappear, whereby the C12A7 compound will not be obtained as a solidified product.

As described above, by a change in the melting time, the solidified product may be a decomposition product phase or the C12A7 compound phase, but it is possible to obtain the desired electroconductive mayenite type compound by controlling the holding time and the melting temperature.

EXAMPLES

Example 1

A mixed powder of calcium carbonate and aluminum oxide was held in air at 1,300° C. for 12 hours to prepare a sintered powder composed of C12A7 crystals. The sintered density of the sintered powder was 50%. Such a sintered powder was put in a covered carbon crucible, heated to 1,650° C. at a temperature raising rate of 400° C./hr, then held for from about 9 to 10 hours in an atmosphere having an oxygen partial pressure in the crucible brought to $10^{-15}$ Pa by absorption of oxygen by carbon and then annealed to room temperature at a temperature lowering rate of 400° C./hr under the same oxygen partial pressure.

The obtained solidified product was a dense solid showing a black color. Further, its powder showed a dark green color. From the X-ray diffraction pattern, this solidified product was found to be a mayenite type compound. The electrical conductivity was about 5 S/cm.

Comparative Example 1

A pressed powder of a mixture of calcium carbonate and aluminum oxide was held in air at 1,300° C. for 12 hours to prepare a sintered powder composed of C12A7 crystals. Such a sintered powder was put in a platinum crucible, heated to 1,650° C. at a temperature raising rate of 400° C./hr, then held for about 9 hours in an air atmosphere having an oxygen partial pressure of $2 \times 10^4$ Pa and then annealed to room temperature at a temperature lowering rate of 400° C./hr.

The obtained solidified product was a colorless solid, and from the X-ray diffraction pattern, it was found to be a mayenite type compound, but showed no electrical conductivity.

Example 2

A pressed powder of a mixture of calcium carbonate and aluminum oxide was held in air at 1,300° C. for 10 hours to prepare a sintered powder composed of C12A7 crystals. The sintered density of the sintered powder was 45%. Such a sintered powder was put in a covered carbon crucible, heated to 1,650° C. at a temperature raising rate of 400° C./hr, then held for from about 2 to 3 hours in an atmosphere having an oxygen partial pressure brought to $10^{-15}$ Pa by absorption of oxygen by carbon and then annealed to room temperature at a temperature lowering rate of 400° C./hr under the same oxygen partial pressure.

The obtained solidified product was a dense solid showing a black color. Further, its powder showed a dark green color. From the X-ray diffraction pattern, the solidified product was found to be a mayenite type compound. The electrical conductivity was about 5 S/cm.

Example 3

A mixed powder of calcium carbonate and aluminum oxide, was put in a platinum crucible, maintained at 1,650° C. for 15 minutes in an electric furnace, and it was rapidly cooled by a twin roller method to obtain C12A7 glass having a thickness of about 0.5 mm. Such glass was pulverized and put in a covered carbon crucible, heated to 1,650° C. at a temperature raising rate of 400° C./hr, then held for about 3 hours in an atmosphere having an oxygen partial pressure brought to $10^{-15}$ Pa by absorption of oxygen by carbon, and then annealed to room temperature at a temperature lowering rate of 400° C./hr under the same oxygen partial pressure.

The obtained solidified product was a dense solid showing a black color. Further, its powder showed a dark green color. From the X-ray diffraction pattern, the solidified product was found to be a mayenite type compound. The electrical conductivity was about 5 S/cm.

As described above, it was possible to produce a mayenite type compound having electroconductivity imparted, from raw materials of calcium carbonate and aluminum oxide, by substituting electrons for free oxygen of the C12A7 compound.

Example 4

Pulverized C12A7 glass or sintered powder of C12A7 crystals was put in a covered carbon crucible, heated to 1,650° C. at a temperature raising rate of 400° C./hr, and then held for about 30 minutes in an atmosphere having an oxygen partial pressure brought to $10^{-15}$ Pa by absorption of oxygen by carbon, and then, the melt was cast on an iron plate in air and solidified.

From the X-ray diffraction, the obtained solidified product was a mixture of glass and a black, dense electroconductive mayenite compound, having the periphery covered with glass. The electroconductivity of the solidified product was $10^{-1}$ S/cm.

Example 5

Three electroconductive C12A7 mayenite type compounds having an electroconductivity of 5 S/cm were processed into plates of 1 mm in thickness and held for three hours at 600° C., 700° C. and 800° C., respectively.

The sample heat-treated at 600° C. was black, one heat-treated at 700° C. was translucent, and one heat-treated at 800° C. was colorless and translucent, and their electroconductivities were about $10^{-1}$ S/cm, $10^{-3}$ S/cm and about $10^{-8}$ S/cm, respectively. From the X-ray diffraction measurements, the heat-treated samples were found to be mayenite type compounds respectively.

Example 6

Two electroconductive C12A7 compounds having an electroconductivity of 5 S/cm were processed into plates of 1 mm in thickness and held at 800° C. for one hour and three hours, respectively. The sample held for one hour was green and the sample held for three hours was colorless, and the electroconductivity was about $10^{-3}$ S/cm with the sample held for one hour, and about $10^{-8}$ S/cm with the sample held for three hours.

As described above, it was possible to substitute oxygen for a part of free electrons in an electroconductive mayenite type compound, and it was possible to prepare mayenite type compounds different in the electroconductivity by changing the temperature and time for the heat-treatment.

Similar results are obtainable also when strontium carbonate is used instead of calcium carbonate as the material in Examples 1 to 3, or when S12A7 is used instead of C12A7 in Examples 4 to 6.

INDUSTRIAL APPLICABILITY

The electroconductive mayenite compound is an electron donor and can be used for e.g. decomposition of an organic substance, as a reducing reagent or as a nucleophilic reagent. Otherwise, by utilizing the nature to take anions in its cages, it can be used for recovery of e.g. chlorine, fluorine, bromine or iodine having a high environmental load. Such anions may constitute a part of the compound. Further, iodine may be radioactive.

Further, the electroconductive mayenite compound is a field-effect type electron emission material, and by utilizing such a nature, a small size electron emission device, display device or X-ray source can be prepared. Further, as an electrode material, it can be utilized as a conductor required to have a special junction property, like a charge-injection material in an organic EL device.

The entire disclosure of Japanese Patent Application No. 2004-037203 filed on Feb. 13, 2004 including specification, claims and summary is incorporated herein by reference in its entirety.

What is claimed is:

1. A method for preparing an electroconductive mayenite type compound, comprising:
   melting a raw material containing Al and at least one element selected from the group consisting of Ca and Sr;
   holding the melt in a low oxygen partial pressure atmosphere; and
   cooling for solidification; wherein
   an oxygen partial pressure of the low oxygen partial pressure atmosphere is not higher than 10 Pa, and
   a direct current conductivity of the electroconductive mayenite type compound is at least $10^{-4}$ S/cm.

2. The method for preparing an electroconductive mayenite type compound according to claim 1, wherein the cooling for solidification is in a low oxygen partial pressure atmosphere.

3. The method for preparing an electroconductive mayenite type compound according to claim 1, wherein the cooling for solidification is in atmospheric air.

4. The method for preparing an electroconductive mayenite type compound according to claim 1, wherein the cooling for solidification is annealing.

5. The method for preparing an electroconductive mayenite type compound according to claim 4, wherein a cooling rate of annealing is at least 200° C./hr and at most 500° C./hr.

6. The method for preparing an electroconductive mayenite type compound according to claim 1, wherein prior to the cooling for solidification the melt is discharged from a crucible.

7. The method for preparing an electroconductive mayenite type compound according to claim 6, wherein a cooling rate is more than 500° C./hr and at most 1,000° C./hr.

8. The method for preparing an electroconductive mayenite type compound according to claim 1, wherein the raw material comprises, as represented by mol % and as calculated as the following oxides, from 15 to 66% of at least one member selected from the group consisting of CaO and SrO, from 14 to 63% of $Al_2O_3$, from 0 to 38% of $SiO_2$, from 0 to 38% of $GeO_2$, from 0 to 38% of $B_2O_3$, from 0 to 5% of $Li_2O$, from 0 to 5% of $Na_2O$, from 0 to 5% of $K_2O$, from 0 to 10% of MgO, from 0 to 10% of BaO, from 0 to 8% of $Fe_{2O3}$ and from 0 to 8% of $TiO_2$, and the total of molar ratios of CaO, SrO and $Al_2O_3$ is at least 25%.

9. The method for preparing an electroconductive mayenite type compound according to claim 1, further comprising holding the prepared electroconductive mayenite type compound in air at a temperature of at least 500° C. and not more than the melting point of the compound to adjust the electroconductivity.

10. The method for preparing an electroconductive mayenite type compound according to claim 9, wherein the electroconductivity of the prepared electroconductive mayenite type compound is adjusted to be at least $10^{-10}$ S and at most $10^3$ S/cm.

* * * * *